Sept. 17, 1963    R. C. HOWARD ETAL    3,104,315
COMPUTER FOR FUNCTIONS SUCH AS TRUE AIRSPEED
Filed Sept. 8, 1959

INVENTORS.
ROBERT CHARLES HOWARD,
ARTHUR W. CONOW,
By Barkelew & Lewis

3,104,315
COMPUTER FOR FUNCTIONS SUCH AS TRUE AIRSPEED

Robert Charles Howard, Costa Mesa, and Arthur W. Conow, La Mirada, Calif., assignors to Giannini Controls Corporation, Pasadena, Calif., a corporation of New York
Filed Sept. 8, 1959, Ser. No. 838,702
16 Claims. (Cl. 235—151)

This invention relates to improved means for electrically computing the value of certain types of functions, which depend upon a plurality of input variables, which typically correspond to definite physical quantities.

The functions to which the invention particularly relates are expressible as the product of a first function of two variables multiplied by a second function of a third variable. Moreover, the first function is typically expressible as a function of the ratio of the two variables upon which it depends.

One illustrative example of the many functions that are of that described type is the true airspeed of an aircraft or the like. A further example of such functions, the value of which may be computed in accordance with the present invention, is the thrust delivered by a jet engine. In each of those illustrative instances, the function to be computed is expressible as a first function of the ratio of two pressures, multiplied by a second function of a temperature.

For clarity of description, and without thereby implying any limitation of its scope, the invention will be described primarily as it relates to systems for the computation of true airspeed.

The invention provides relatively simple and economical mechanism which is capable of computing functions of the described type with greater accuracy than was previously possible with comparable systems. In particular, in the computation of true airspeed, the invention is capable of taking substantially full account of the dependence of true airspeed upon ram temperature, while avoiding the complexity of prior art systems that provided equivalent accuracy.

True airspeed V is a unique function of a pressure ratio and of the absolute or ram temperature T. The pressure ratio may be taken as the ratio of any two of the following three pressures: the static pressure $P_s$, the dynamic or total pressure $P_t$, and the differential pressure $q_c = P_t - P_s$. For definiteness and clarity of the present description, the true airspeed will initially be considered as a function of the ram temperature T and the particular pressure ratio $$P = \frac{q_c}{P_s} \quad (1)$$

It is emphasized, however, that corresponding considerations apply to the other pressure ratios indicated.

The nature of the dependence of true airspeed V on the pressure ratio P and ram temperature T is such that it may be expressed as the product of a function $V_0(P)$ of the pressure ratio alone and a function $F(T/T_0)$ of the ram temperature alone:

$$V = V_0(P) \cdot F(T/T_0) \quad (2)$$

where $V_0(P)$ represents the true airspeed at some fixed base temperature $T_0$.

It is well known that the true airspeed V can be computed with good accuracy, in accordance with Equation 2, by employing one servo computing system to take account of the dependence of $V_0$ upon the pressure ratio P and a second servo computing system to take account of the dependence of F on the ram temperature T. Such systems are relatively costly and complex.

Computing systems are also known in which only one servo computing circuit is required and in which the effect of ram temperature is taken into account only approximately by means of variable passive elements of a network. Such systems are simpler and more reliable in operation, and considerably more economical. However, they have the severe disadvantage of involving approximations that are inconvenient or unacceptable for many purposes. Reasonably accurate temperature compensation can be obtained in such prior art circuits only within a narrow range of values, and for other values the computation involves appreciable error.

A primary specific object of the present invention is to provide a computing system for functions of the described type, which system requires only a single servo loop, but which affords compensation for the third input variable that is far more accurate than has been possible with previously available mechanisms of that type.

In accordance with one aspect of the invention, our computing system, as illustratively embodied in a true airspeed computer, utilizes a balance potentiometer, or its equivalent, and a circuit network containing circuit elements that are caused to vary automatically in accordance with changes in static and pitot pressures. The balance potentiometer is driven by a servo system to maintain voltage balance at the potentiometer brush. The circuit network is such that the brush position represents directly the value of $V_0$, the true airspeed at the selected base temperature $T_0$.

In such a system the temperature correction function $F(T/T_0)$ can be introduced into a system of the described type by means of a temperature responsive impedance connected in the circuit containing the balance potentiometer. The brush position then represents not only the true airspeed $V_0$ at the base temperature $T_0$, but also represents with good accuracy the true airspeed V at all temperature values within the range of the system. However, we have found that such temperature compensation can be correct at all potentiometer positions only if the airspeed represented by the brush position is linearly related to the balance resistance actually tapped by the potentiometer brush. That condition is satisfied, for example, if the potentiometer winding is linear and if the brush movement is linearly related to true airspeed.

Because of that limitation in providing the temperature function $F(T/T_0)$ by means of a passive temperature responsive impedance, the balance potentiometer itself cannot be shaped to any appreciable extent. Hence the dependence of $V_0$ upon the pressure ratio P must be computed substantially completely by other portions of the system. Any shaping of the balance potentiometer that may be employed for correcting errors in that computation must be held to a minimum if accurate temperature compensation is to be attained.

As already indicated, the true airspeed $V_0$ at the base temperature $T_0$ is a function of pressure ratio alone, so that, taking the illustrative pressure ratio defined by (1), $$V_0 = V_0\left(\frac{q_c}{P_s}\right) \quad (3)$$

The actual nature of that functional relation is well known from published theoretical derivations confirmed under various conditions of flight, and need not be repeated here.

It has previously been proposed to approximate the actual relation (3) by a function $F_1$, which is essentially an exponential power of the pressure ratio P, and which may be written $$F_1\left(\frac{q_c}{P_s}\right) = K\left(\frac{q_c}{P_s}\right)^a \quad (4)$$

where K is a constant of proportionality. That approximate relation can be mechanized effectively by driving respective impedance elements of a suitable circuit in accordance with $q_c{}^a$ and $P_s{}^a$, as is described, for example, in Patent 2,574,656, issued on November 13, 1951, to John B. Peterson.

However, at least in the form described in that patent, such a system suffers from the serious disadvantage explained above. It is not possible in practice to select values of the two constants K and $a$ in (4) such that $F_1$ accurately matches $V_0$ as defined in (3) throughout any generally useful range of true airspeeds. Since the expression (4) is only a rough approximation of the true functional relation (3), a non-linear correction of that approximation must be introduced at some other point in the system. In practice, such correction must be made in the balance potentiometer portion of the system, such as in the potentiometer itself, its drive mechanism, or its circuit. That leads to appreciable departure from linearity in the action of the balance potentiometer. With that non-linearity, a passive temperature responsive network cannot provide accurate temperature correction throughout the range of true airspeeds.

In accordance with the present invention, we have discovered that greatly improved flexibility and accuracy can be attained in a single-servo system for computing true airspeed, for example, in the following way. Instead of attempting to match the actual values of (3) by an approximation such as (4), we have found that it is sufficient to match the respective slopes of two such expressions, considered as functions of the pressure ratio P. That type of matching may be expressed by the differential equation $$\frac{dF_2}{dP} = \frac{dV_0}{dP} \quad (5)$$

Integration of (5) gives a relation of the form $$F_2 = K_0\left(\frac{q_c}{P_s}\right)^b = V_0\left(\frac{q_c}{P_s}\right) + V_1 \quad (6)$$

where $K_0$ is a constant, $V_0$ is the function of $q_c/P_s$ given by (3) and $V_1$ is an arbitrary constant of integration. We have found that the actual dependence of $V_0$ upon $q_c/P_s$ is such that it is possible to find values of the constants $K_0$ and $b$ for which $V_1$ in Equation 6 is appreciably different from zero but is substantially constant over a relatively wide range of true airspeeds.

Moreover, we have found that it is possible to provide a computing system that operates in accordance with relations having the form of (6) and in which the presence of the term $V_1$ does not lead to inaccuracy in the temperature correction, even when that correction is provided by means of a passive temperature responsive network.

A full understanding of the invention, and of its further objects and advantages, will be had from the following description of certain illustrative manners in which it may be carried out. That description, of which the accompanying drawings form a part, is intended only as illustration, and not as a limitation upon the true scope of the invention, which is defined in the appended claims.

Figure 1:
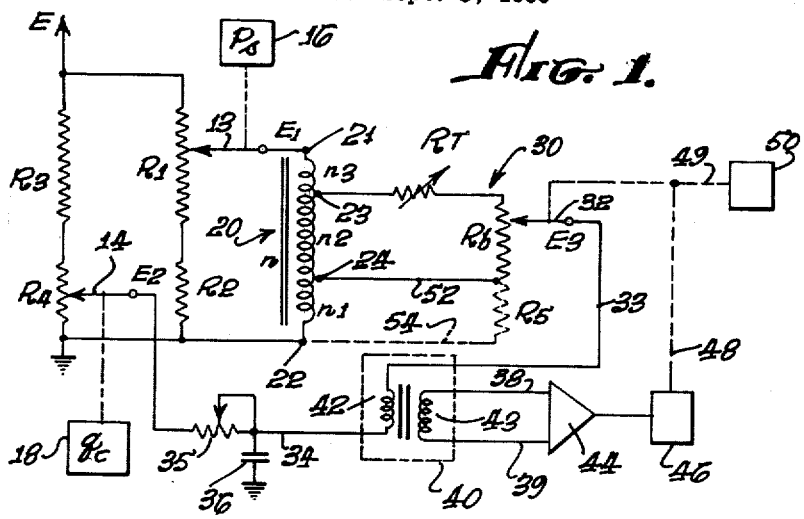
FIG. 1 is a schematic diagram representing an illustrative true airspeed computer in accordance with one aspect of the invention.

An illustrative embodiment of the invention, as it pertains to the typical computation of true airspeed, is represented schematically in FIG. 1. A source of alternating current power E is connected to ground through two parallel voltage dividing resistance networks $R_1$, $R_2$ and $R_3$, $R_4$, of which $R_1$ and $R_4$ are potentiometers with brushes 13 and 14, respectively. Brush 13 is driven automatically by mechanism represented schematically at 16 in response to the static pressure $P_s$, which is typically derived in known manner from a suitable static pressure orifice on the aircraft or other vehicle. The potentiometer winding $R_1$ is so shaped, with regard to the value of resistance $R_2$ and the action of brush drive 16, that the voltage $E_1$ tapped by brush 13 is $$E_1 = EK_1 P_s{}^b \quad (7)$$

where the exponent $b$ has the same value as in (6).

Brush 14 of potentiometer $R_4$ is similarly driven by suitable mechanism represented schematically at 18 in response to the differential pressure $q_c = P_t - P_s$. Winding $R_4$ is so shaped, with regard to the action of brush drive 18, that the voltage $E_2$ tapped by brush 14 is $$E_2 = EK_2 q_c{}^b \quad (8)$$

The illustrative network just described may be varied widely in detailed design. For example, if the system is intended to accept values of $P_s$ close to zero, $R_2$ may be incorporated in potentiometer winding $R_1$. On the other hand, if $R_4/R_3$ is less than $R_2/R_1$, potentiometer $R_4$ may be connected directly in series with $R_1$, with or without fixed series resistance, the parallel branch of the illustrated network being then unnecessary.

Voltage $E_1$ is supplied to one end terminal 21 of the auto-transformer 20, the opposite end terminal 22 being grounded. Two intermediate terminals 23 and 24 are provided on transformer 20 at positions to be more fully described. The balance potentiometer $R_b$ has its winding connected in a circuit, represented generally by the numeral 30, which shunts that portion of the transformer winding between terminals 23 and 24. Circuit 30 includes impedance means $R_T$ responsive to the ram temperature T. That temperature responsive means may include a plurality of components arranged in any desired configuration, but is represented schematically for clarity of illustration as a single variable resistance element connected in series between balance potentiometer $R_b$ and terminal 23.

The brush 32 of balance potentiometer $R_b$ receives a voltage $E_3$. That voltage is supplied via the line 33 as one input signal to a comparison circuit indicated generally at 40. Voltage $E_2$, already described, is supplied to circuit 40 as a second input signal via the line 34 and a suitable phase compensating network represented illustratively as the adjustable resistance 35 and grounded capacitor 36. Comparison circuit 40 may comprise any suitable circuit for comparing the two input signals $E_2$ and $E_3$ and deriving an error signal that represents their difference. As illustratively shown, comparison circuit 40 comprises a transformer having its primary 42 connected between the two input lines 33 and 34. The error signal is developed across the transformer secondary 43, and is supplied via the lines 38 and 39 to a phase sensitive servo amplifier 44. The output from amplifier 44 controls the servo motor 46, which may be of conventional type and which drives the brush 32 of the balance potentiometer via a driving connection represented schematically at 48. That drive is arranged to move brush 32 in a direction to reduce the amplitude of the error signal from circuit 40, thus maintaining substantial equality between the voltages $E_2$ and $E_3$. The servo action may thus be expressed $$E_2 = E_3 \tag{9}$$

In the present circuit, denoting by $n_1$, $n_2$, and $n_3$ the numbers of turns in the respective sections of auto-transformer 20, and representing the total turns by N, $$E_3 = E_1 \left[ \frac{n_1}{N} + \frac{n_2}{N} \frac{xR_b}{R_b + R_{T_0}} \right] \tag{10}$$

where x denotes the fraction of the total resistance of $R_b$ that lies between brush 32 and terminal 24; and $R_{T_0}$ denotes the value of resistance $R_T$ at the base temperature $T_0$.

Substituting from (7), (8) and (9) in (10), $$\frac{K_2}{K_1}\left(\frac{q_c}{P_s}\right)^b = \frac{n_2}{N} \frac{R_b}{R_b + R_{T_0}} x + \frac{n_1}{N} \tag{11}$$

Since Equation 11 is of the same form as Equation 6, the circuit of FIG. 1 provides a valid mechanization of the latter equation. For that purpose, $n_1$, $n_2$ and N are typically so selected that $$\frac{n_1}{N} = \frac{K_2}{K_1 K_0} V_1 \tag{12}$$

and $$\frac{n_2}{n_1} = \frac{R_b + R_{T_0}}{R_b} \frac{V_{0m}}{V_1} \tag{13}$$

where $K_0$ is the constant defined by (6); and $V_{0m}$ is the maximum value of $V_0$ which the system is to handle.

The position of brush 32 of balance potentiometer $R_b$ then represents the value of $V_0$ in accordance with the relation $$V_0 = V_{0m} x \tag{14}$$

In order to provide correct temperature compensation at all airspeeds, it is sufficient that temperature responsive impedance $R_T$ be arranged to provide correct compensation for any arbitrarily selected value of $V_0$, such, for example, as $V_{0m}$. In general, the required temperature function defined in (2) above is of the form $$F(T) = \left(\frac{T}{T_0}\right)^{1/2} \tag{15}$$

Accordingly, $R_T$ is typically chosen so that $$\frac{R_b + R_T}{R_b + R_{T_0}} = \left(\frac{T}{T_0}\right)^{1/2} \tag{15a}$$

The impedance of circuit 30 can readily be made to vary with temperature in that manner by providing a suitably designed network $R_T$ which contains one or more resistances having known temperature coefficients of resistivity and exposed to ram temperature in a suitably designed temperature probe of conventional type. With temperature compensation thus provided by passive elements within circuit 30, the left side of Equation 14 represents the true airspeed V. That value may be taken from the balance potentiometer itself, or from any convenient point of drive mechanism 48, and supplied, as by a shaft indicated schematically at 49, to an output device 50 of any desired type. Device 50 may, for example, represent a meter which visually indicates the value of true airspeed in knots or other suitable units; or may comprise a control device of known type for performing definite control functions at predetermined respective positions of shaft 49.

It is emphasized in connection with FIG. 1 that the voltage standing on the portion $n_1$ of transformer 20 is not affected by changes in ram temperature. That follows from the fact that the temperature compensating network is confined to circuit 30, both ends of which are set at definite respective potentials at terminals 23 and 24 by the action of transformer 20. For that reason the described circuit is quite distinct from the circuit that would result if the connection 52 from $R_b$ to terminal 24 were omitted and replaced by a connection 54 to transformer end terminal 22 via a resistance $R_5$, as shown in dashed lines in FIG. 1. The latter circuit can be made equivalent to that shown in solid lines by causing the value of $R_5$ to vary with the temperature in accordance with the relation $$R_5 = \frac{n_1}{n_2}(R_b + R_T) \tag{16}$$

The described transformer action may be considered as providing such a variable virtual resistance in series with $R_T$ and $R_b$ in the position shown.

Terminal 23 may, if desired, coincide with end terminal 21, but it is ordinarily preferred to have those terminals spaced as widely as is practicable in order to obtain electrical isolation of circuit 30 from potentiometer $R_1$. For that purpose the ratio $(n_1 + n_2)/N$ is preferably in the range from about 1/10 to about 1/4. For purposes of description, the input signal to transformer 20 may be considered to consist of that portion of voltage $E_1$ between terminals 22 and 23.

The present invention is useful in connection with a wide variety of circuit configurations for performing the basic computation of $V_0$ as a function of pressure ratio. An illustrative alternative circuit for that purpose and embodying the invention is represented schematically in FIG. 2. Variable resistances $R_6$ and $R_7$ are connected in series between an alternating current power source E and ground, and are controlled automatically by respective devices 16a and 18a so that $$R_6 = EC_1 P_s^d \tag{17}$$

and $$R_7 = EC_2 q_c^d \tag{18}$$

The transformer 20a is connected via the lines 66 and 67 between E and ground in parallel with $R_6$, $R_7$, and has an intermediate tap 24a. A circuit 30a, comprising a balance potentiometer $R_b$ and temperature responsive network $R_T$, and corresponding to circuit 30 of FIG. 1, is connected between transformer terminals 23a and 24a. A voltage comparison device 40a, which may, for example, be of the type already described in connection with FIG. 1, is provided with two signal inputs; one via the line 62 from the junction 63 of resistances $R_6$ and $R_7$; and the other via the line 64 from the brush 32a of the balance potentiometer in circuit 30a. Brush 32a is typically driven via the shaft 48 by servo amplifier 44 and motor 46 under control of the error signal developed by comparison device 40a.

Figure 2:
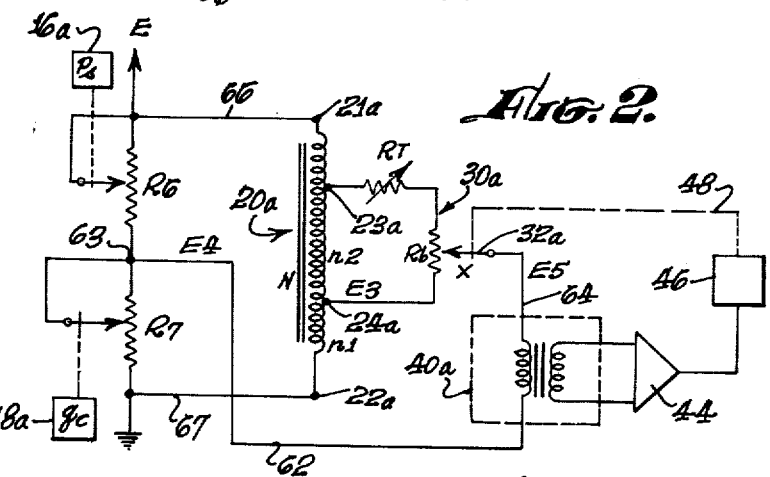
FIG. 2 is a schematic diagram representing a modification.

With the illustrative circuit of FIG. 2, the signal $E_4$ on line 62 may be represented, in view of (17) and (18), by the relation $$E_4 = \frac{E}{1 + \frac{C_1}{C_2}\left(\frac{P_s}{q_c}\right)^d} \tag{19}$$

and the signal $E_7$ on line 64 by the relation $$E_7 = E\left(\frac{n_1}{N} + \frac{n_2}{N}\frac{R_b}{R_b + R_T} X\right) \tag{20}$$

The servo loop maintains $E_4$ and $E_5$ substantially equal, so that, with appropriate selection of component values, the brush position X represents $V_0$ on the basis of an approximate relation of the form $$\frac{1}{1+C_0\left(\frac{P_s}{q_c}\right)^d}=V_0+V_1 \qquad (21)$$

That relation corresponds to Equation 6 for the previously described embodiment. Relations (12) and (13) apply to the present embodiment if $K_0$, $K_1$ and $K_2$ are replaced by $C_0$, $C_1$ and $C_2$, respectively.

As a further illustrative modification, variable resistance $R_7$ of FIG. 2 may be replaced by a potentiometer, with line 62 connected to the potentiometer brush rather than to the junction point 63. That configuration is shown illustratively in FIG. 3. Variable resistance $R_8$ is so driven by mechanism 16$b$ in response to $P_s$ that $$R_8+R_9=EK_1P_s^b \qquad (22)$$

Potentiometer $R_9$ is so driven by mechanism 18$b$ in response to $q_c$ that the resistance $R_x$ between brush 14$b$ and ground is $$R_x=K_2q_c^b \qquad (23)$$

The voltage $E_5$ tapped by brush 14$b$ on line 62$a$ is then $$E_5=\frac{K_2}{K_1}\left(\frac{q_c}{P_s}\right)^b \qquad (24)$$

If the remainder of the system is as shown in FIG. 2, for example, the action of the system conforms to relations (11) to (15), discussed above in connection with FIG. 1. The system then provides a measure of true airspeed based on the close approximation defined by (6).

The system of FIG. 2, with or without the modification just described, has the advantage of being readily adaptable to the use of direct rather than alternating current power. For example, if E in FIG. 2 is considered to represent a direct current power source, transformer 20$a$ may be omitted entirely and the lower terminal of $R_b$ connected to ground via a battery or equivalent, which provides a source $E_6$ of direct current voltage having a definite relation to E such that $$\frac{E_6}{E}=\frac{C_2}{C_0C_1}V_1 \qquad (25)$$

Figures 3, 4:
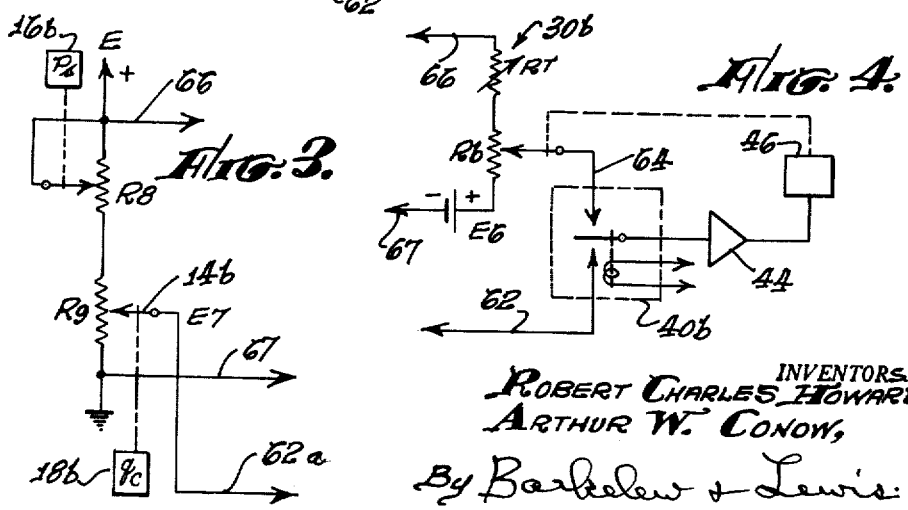
FIG. 3 is a fragmentary schematic diagram representing a further modification.
FIG. 4 is a fragmentary schematic diagram representing another modification.

An illustrative system of that type is represented schematically in FIG. 4, in which lines 62, 66 and 67 may correspond to the respective lines so numbered in FIG. 2 or in FIG. 3. The indicated polarity of voltage source $E_6$ corresponds, for example, to the situation in which E of FIGS. 2 or 3 in positive with respect to ground, and $V_1$ in Equation 6 or 21 is positive.

Comparison device 40$b$ is of any suitable type for comparing the two direct current signals on lines 62 and 64 and developing an error signal, preferably of alternating type, for supply to servo amplifier 44. As typically shown, device 40$b$ comprises a switch driven at a definite frequency by an alternating current winding. It may be noted that, since circuit 30$b$ in FIG. 4 is connected directly to line 66, the action corresponds to the modification of FIG. 1, already described, wherein $n_3$ equals zero.

For certain uses of airspeed computers it is not necessary to take account of the dependence of airspeed upon ram temperature. The resulting airspeed value is then proportional to Mach number. Variable resistance network $R_T$ of the typical systems that have been described may then be omitted or replaced by a fixed resistance. The present invention is advantageous in systems of that type, as well as in true airspeed computers, since the actual dependence of $V_0$ upon the pressure ratio P can be matched by a power of P far more closely in terms of slope than in absolute values, since an additional arbitrary parameter becomes available when the slopes are matched. The slope matching procedure, described above in connection with Equations 5 and 6, is particularly effective in connection with Machmeters in which it is desired that the balance potentiometer $R_b$ be strictly linear in its construction and action.

Throughout the preceding discussion, and in the drawings, the static pressure $P_s$ may be replaced by the dynamic pressure $P_t$. The detailed functional relations are thereby altered in known manner, without departing from the fundamental form of the various expressions upon which the invention is based. Also, the differential pressure $q_c$ may be replaced throughout the discussion by the dynamic pressure $P_t$. In each instance, the true airspeed is expressed as the product of a function of ram temperature alone multiplied by a function of pitot and static pressure alone, the latter function being expressible in turn as the sum of a constant value and a simple function, typically given by (6) or (21), of a constant exponential power of the ratio of two pressures selected from pitot pressure, static pressure and differential pressure.

It will be noted that the ratio of the voltage signals $E_2$ and $E_1$ in the system of FIG. 1 is $$\frac{K_2}{K_1}\left(\frac{q_c}{P_s}\right)^b \qquad (26)$$

which is proportional to $F_2$ of Equations 5 and 6. The same is true of the voltage ratio $E_7/E$ in the system of FIG. 3, where E is the reference voltage at line 66.

In the system of FIG. 2, the voltage ratio $E_4/E$ is similarly of the same form as the left side of Equation 21. Hence in each instance, two voltages are developed the ratio of which is proportional to a function of a constant exponential power of the two input variables, which are pressures in the instance described.

The invention is also useful for computing a wide variety of functions, in addition to true airspeed, that are expessible in the general form $$G_1\left(\frac{x}{y}\right)\cdot G_2(z) \qquad (27)$$

where $G_1$ is a function of the ratio of two input variables $x$ and $y$; and $G_2$ is a function of a third input variable $z$ and is in the nature of a correction factor, which may be omitted from the computation if desired. The variables $x$, $y$ and $z$ correspond generally to $q_c$, $P_s$ and T, respectively, in the preceding description.

In particular, it is well known that the thrust of a turbojet engine can be expressed to a useful degree of approximation in the form (27) where $x$ represents the turbine discharge pressure, usually written $P_{T_7}$; $y$ represents the inlet air total pressure, usually written $P_{T_2}$; and $z$ represents the temperature at the inlet to the compressor, which is closely related to the ram temperature. The present illustrative description of true airspeed computing systems in accordance with the invention may be made applicable also to thrust computing systems by replacing $q_c$ by $P_{T_7}$; $P_s$ by $P_{T_2}$; and by interpreting T and $T_0$ as representing temperature at the inlet to the compressor. With appropriate changes in terminology, the preceding description is similarly applicable to systems for computing other functions expressible in the general form (27).

We claim:

1. A system for computing the value of a quantity which depends upon a function of the ratio of two input variables, said system comprising in combination means responsive to said input variables for developing two electrical voltage signals the ratio of which represents the difference between said function and a constant value, means acting to divide one of said voltage signals into at least two signal portions having a fixed ratio such that one of said signal portions represents said contant value, drivable means for deriving from another of the signal portions a variable fraction thereof, differential circuit means for comparing the other electrical voltage signal with the sum of said variable fraction and said one signal portion, said drivable means being drivable to vary the value of said fraction and thereby to vary the value of said sum without altering the value of said one signal portion, servo means for driving said drivable means to maintain balanced condition of the differential circuit means, and output means driven with said drivable means and representing the value of said quantity.

2. A system as defined in claim 1, and wherein said function of the ratio is a constant exponential power of the ratio and said electrical voltage signals are proportional to the respective input variables raised to said constant exponential power.

3. A system as defined in claim 1, and wherein one of said electrical voltage signals is constant and the other represents said function.

4. A system as defined in claim 1, and wherein said means acting to divide one of said signals comprises an autotransformer having a winding with a plurality of taps, circuit means for applying said one voltage signal between two of said taps, and respective circuit means connected between said two taps and an intermediate tap.

5. A system as defined in claim 1, and wherein said one voltage signal is equal to a constant reference voltage, and said means acting to divide said one signal comprises a circuit connected in shunt to said signal and comprising in series impedance means and a source of voltage of constant magnitude.

6. A system as defined in claim 1, and wherein said dividing means and said output means respond substantially linearly with respect to their driven movement.

7. A system for computing the value of a quantity which is expressible as the product of a first function of the ratio of two input variables multiplied by a second function of a third input variable, the rate of change of said first function with respect to said ratio being substantially equal to that of a predetermined function of a constant exponential power of said ratio, said system comprising in combination means responsive to said two input variables for developing two electrical voltage signals the ratio of which represents said predetermined function, means acting to divide one of said voltage signals into at least two signal portions having a fixed ratio, means responsive to said third input variable for modifying only one of said two signal portions in proportion to said second function, dividing means for deriving from the modified signal portion a variable fraction thereof and adding the same to the unmodified other signal portion to form a comparison signal, said dividing means being drivable to vary the value of said fraction, differential circuit means for comparing the other electrical voltage signal with said comparison signal, servo means for driving said dividing means to maintain balanced condition of the differential circuit means, and output means driven with said dividing means and representing the value of said quantity.

8. A system as defined in claim 7, and wherein said electrical voltage signals are proportional to the respective input variables raised to said constant exponential power.

9. A system as defined in claim 7, and wherein one of said electrical voltage signals is constant and the other represents said function.

10. A system for computing the true airspeed of an aircraft or the like as the product of a first function of the ratio of two pressures derivable from the pitot and static pressures multiplied by a second function of ram temperature only, said first function being expressible substantially as the sum of a constant value and a predetermined function of a constant exponential power of said ratio, said system comprising in combination means responsive to pitot and static pressure for developing two electrical voltage signals whose ratio is proportional to said predetermined function, means acting to divide one of said voltage signals into at least two signal portions having a fixed ratio, one of said signal portions corresponding to said constant value, means responsive to the ram temperature for modifying only the other one of said signal portions in proportion to said second function, dividing means for deriving from the modified signal portion a variable fraction thereof and adding the same to said one signal portion to form a comparison signal, said dividing means being drivable to vary the value of said fraction, differential circuit means for comparing the other said voltage signal with the comparison signal, servo means for driving said dividing means to maintain balanced condition of the differential circuit means, and output means driven with said dividing means and representing the true airspeed.

11. A system as defined in claim 10, and wherein one of said electrical voltage signals is proportional to a constant exponential power to static pressure and the other voltage signal is proportional to the same exponential power of the difference between pitot and static pressures.

12. A system as defined in claim 10, and wherein one of said electrical voltage signals is equal to a constant reference voltage and the other voltage signal is a function of a constant exponential power of the difference between pitot and static pressures divided by the static pressure.

13. A system as defined in claim 10, and wherein said means acting to divide one of said signals comprises an autotransformer having a winding with a plurality of taps, circuit means for applying said one voltage signal between two of said taps, and respective circuit means connected between said two taps and an intermediate tap.

14. In a system for computing true airspeed, the combination of means for developing a first voltage that is directly proportional to a predetermined constant exponential power of one linear function of pitot and static pressures, means for developing a second voltage that is directly proportional to the same exponential power of a second linear function of pitot and static pressures, impedance means variable in response to ram temperature, a potentiometer having a winding and a brush movable over the winding, circuit means comprising two terminals and including the impedance means and the winding connected between the terminals, means for supplying to the terminals voltages that are equal to respective predetermined different fractions of said first voltage, said fractions being different from zero and being substantially independent of variations in the value of said temperature responsive impedance means, means responsive to the difference between said second voltage and the voltage at the potentiometer brush, and servo means for driving the potentiometer under control of said difference voltage, the potentiometer position representing substantially the value of true airspeed that corresponds to said pitot and static pressures and said ram temperature.

15. A system for computing the true airspeed of an aircraft or the like as the product of a first function of pitot and static pressures only multiplied by a second function of ram temperature only, said system comprising in combination means responsive to pitot and static pressures for developing respective electrical voltage signals whose ratio is proportional to the difference between said first function and a constant value, an auto-transformer having one terminal of its winding connected to ground, means for supplying one of said voltage signals to another terminal of the winding, a potentiometer having a winding and a brush movable over the winding, impedance means variable in response to ram temperature and connected in series with the potentiometer winding between two terminals of the transformer winding which are spaced from each other and from said grounded terminal, means responsive to the difference between said second voltage signal and the voltage at the potentiometer brush, and servo means for driving the potentiometer under control of said difference voltage, the potentiometer position representing substantially the value of true airspeed that corresponds to said pitot and static pressures and said ram temperature.

16. A system for computing Mach number of an aircraft or the like, as a function of the ratio of two pressures derivable from the pitot and static pressures, said system comprising in combination means for developing two voltage signals that are proportional respectively to equal constant exponential powers of said two pressures, means acting to divide one of said voltage signals into at least two signal portions having a fixed ratio, drivable means for deriving from one of the signal portions a variable fraction thereof, differential circuit means for comparing the other electrical voltage signal with the sum of said variable fraction and said one signal portion, said drivable means being drivable to vary the value of said fraction and thereby to vary the value of said sum without altering the value of said one signal portion, servo means for driving said drivable means to maintain balanced condition of the differential circuit means, and output means drivin with said drivable means and representing Mach number.

References Cited in the file of this patent
UNITED STATES PATENTS

| | | |
|---|---|---|
| 2,574,656 | Peterson | Nov. 13, 1951 |
| 2,869,367 | Moore | Jan. 20, 1959 |
| 2,955,761 | Brown et al. | Oct. 11, 1960 |

FOREIGN PATENTS

| | | |
|---|---|---|
| 1,121,884 | France | May 7, 1956 |

UNITED STATES PATENT OFFICE
CERTIFICATE OF CORRECTION

Patent No. 3,104,315 September 17, 1963

Robert Charles Howard et al.

It is hereby certified that error appears in the above numbered patent requiring correction and that the said Letters Patent should read as corrected below.

Column 8, line 68, for "contant" read -- constant --; column 10, line 14, for "to" read -- of --.

Signed and sealed this 7th day of April 1964.

(SEAL)
Attest:
ERNEST W. SWIDER
Attesting Officer

EDWARD J. BRENNER
Commissioner of Patents